US 6,644,523 B1

(12) United States Patent
Salas

(10) Patent No.: US 6,644,523 B1
(45) Date of Patent: Nov. 11, 2003

(54) STORAGE DEVICE

(76) Inventor: James R. Salas, 210 La Cienega La. NW., Albuquerque, NM (US) 87107

( * ) Notice: Subject to any disclaimer, the term of this patent is extended or adjusted under 35 U.S.C. 154(b) by 124 days.

(21) Appl. No.: 09/953,041

(22) Filed: Sep. 14, 2001

(51) Int. Cl.[7] ................................................. B60R 7/00
(52) U.S. Cl. .................... 224/275; 224/42.11; 224/281; 296/37.15; 297/188.08; 297/188.11
(58) Field of Search ................................. 224/275, 281, 224/42.11, 539, 542; 296/37.15; 297/188.08, 188.09, 188.1, 188.11, 188.12, 188.2

(56) References Cited

U.S. PATENT DOCUMENTS

| 4,830,579 | A | | 5/1989 | Cheng |
| 5,039,155 | A | * | 8/1991 | Suman et al. ............. 296/65.03 |
| 5,096,249 | A | * | 3/1992 | Hines ..................... 296/37.15 |
| 5,667,115 | A | | 9/1997 | Verhaeg |
| 5,709,329 | A | | 1/1998 | Johnson |
| 5,902,009 | A | | 5/1999 | Singh et al. |
| 6,074,000 | A | * | 6/2000 | Wagner .................. 297/188.11 |
| 6,082,802 | A | | 7/2000 | Vigilante |
| D433,809 | S | | 11/2000 | Dibben |
| 6,161,896 | A | * | 12/2000 | Johnson et al. .......... 297/188.1 |
| 6,386,612 | B2 | * | 5/2002 | Hofmann et al. ........ 296/37.15 |

* cited by examiner

Primary Examiner—Stephen K. Cronin

(57) ABSTRACT

A storage device for positioning below a rear seat in a pick-up truck. The storage device includes a housing having a bottom wall and a peripheral wall attached to and extending upwardly from the bottom wall. The peripheral wall includes a front wall, a back wall, a first side wall and a second side wall. A pair of intermediate walls extend from the back wall to the front wall and are spaced from each other such that the housing is divided into a first compartment, a second compartment and a third compartment wherein the second compartment is positioned between the first and third compartments. A cover is pivotally coupled to an upper edge of the back wall. The cover is positionable over the housing. The housing may be positioned below a rear seat in a pick-up truck.

5 Claims, 3 Drawing Sheets

STORAGE DEVICE

BACKGROUND OF THE INVENTION

1. Field of the Invention

The present invention relates to storage devices for vehicles and more particularly pertains to a new storage device for positioning below a rear seat in a pick-up truck.

2. Description of the Prior Art

The use of storage devices for vehicles is known in the prior art. More specifically, storage devices for vehicles heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,667,115; U.S. Pat. No. 6,082,802; U.S. Pat. No. 5,902,009; U.S. Pat. No. 5,709,329; U.S. Pat. No. 4,830,579; and U.S. Des. Pat. No. 433,809.

While these devices fulfill their respective, particular objectives and requirements, the aforementioned patents do not disclose a new storage device. The inventive device includes a housing having a bottom wall and a peripheral wall attached to and extending upwardly from the bottom wall. The peripheral wall includes a front wall, a back wall, a first side wall and a second side wall. A pair of intermediate walls extend from the back wall to the front wall and are spaced from each other such that the housing is divided into a first compartment, a second compartment and a third compartment wherein the second compartment is positioned between the first and third compartments. A cover is pivotally coupled to an upper edge of the back wall. The cover is positionable over the housing. The housing may be positioned below a rear seat in a pick-up truck.

In these respects, the storage device according to the present invention substantially departs from the conventional concepts and designs of the prior art, and in so doing provides an apparatus primarily developed for the purpose of positioning below a rear seat in a pick-up truck.

SUMMARY OF THE INVENTION

In view of the foregoing disadvantages inherent in the known types of storage devices for vehicles now present in the prior art, the present invention provides a new storage device construction wherein the same can be utilized for positioning below a rear seat in a pick-up truck.

The general purpose of the present invention, which will be described subsequently in greater detail, is to provide a new storage device apparatus and method which has many of the advantages of the storage devices for vehicles mentioned heretofore and many novel features that result in a new storage device which is not anticipated, rendered obvious, suggested, or even implied by any of the prior art storage devices for vehicles, either alone or in any combination thereof.

To attain this, the present invention generally comprises a housing having a bottom wall and a peripheral wall attached to and extending upwardly from the bottom wall. The peripheral wall includes a front wall, a back wall, a first side wall and a second side wall. A pair of intermediate walls extend from the back wall to the front wall and are spaced from each other such that the housing is divided into a first compartment, a second compartment and a third compartment wherein the second compartment is positioned between the first and third compartments. A cover is pivotally coupled to an upper edge of the back wall. The cover is positionable over the housing. The housing may be positioned below a rear seat in a pick-up truck.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new storage device apparatus and method which has many of the advantages of the storage devices for vehicles mentioned heretofore and many novel features that result in a new storage device which is not anticipated, rendered obvious, suggested, or even implied by any of the prior art storage devices for vehicles, either alone or in any combination thereof.

It is another object of the present invention to provide a new storage device which may be easily and efficiently manufactured and marketed.

It is a further object of the present invention to provide a new storage device which is of a durable and reliable construction.

An even further object of the present invention is to provide a new storage device which is susceptible of a low cost of manufacture with regard to both materials and labor, and which accordingly is then susceptible of low prices of sale to the consuming public, thereby making such storage device economically available to the buying public.

Still yet another object of the present invention is to provide a new storage device which provides in the apparatuses and methods of the prior art some of the advantages thereof, while simultaneously overcoming some of the disadvantages normally associated therewith.

Still another object of the present invention is to provide a new storage device for positioning below a rear seat in a pick-up truck.

Yet another object of the present invention is to provide a new storage device which includes a housing having a bottom wall and a peripheral wall attached to and extending upwardly from the bottom wall. The peripheral wall includes a front wall, a back wall, a first side wall and a second side wall. A pair of intermediate walls extend from the back wall to the front wall and are spaced from each other such that the housing is divided into a first compartment, a second compartment and a third compartment wherein the second compartment is positioned between the first and third compartments. A cover is pivotally coupled to an upper edge of the back wall. The cover is positionable over the housing. The housing may be positioned below a rear seat in a pick-up truck.

Still yet another object of the present invention is to provide a new storage device that is retrofitted to fit below the rear seat of an extended cab pick-up truck. The interior of pick-up trucks offers a large amount of storage space below the rear seat. The device organizes tools and other items for storage in this space.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
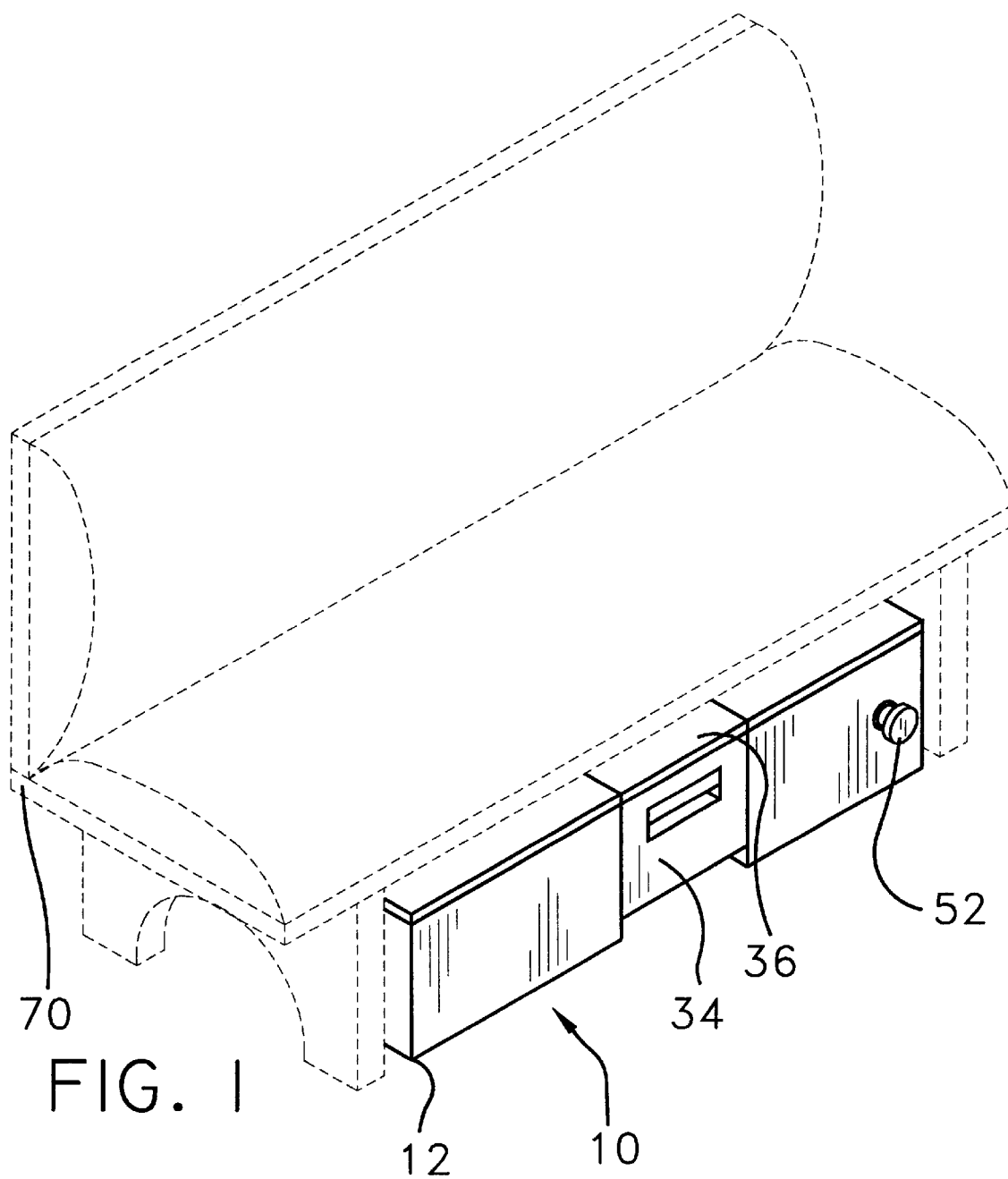
FIG. 1 is a schematic perspective view of a new storage device according to the present invention.
Figure 2:
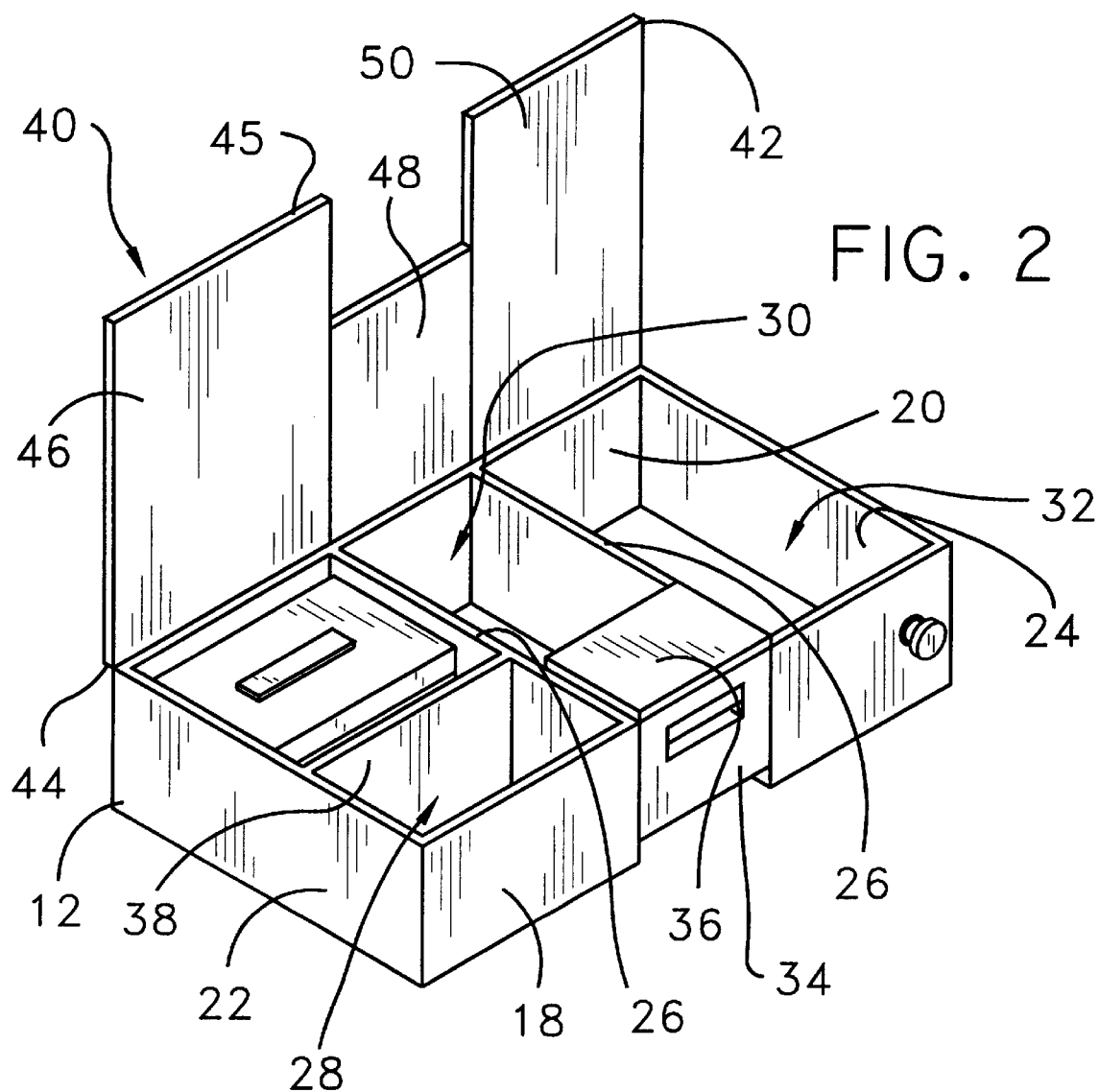
FIG. 2 is a schematic perspective view of the present invention.
Figure 3:
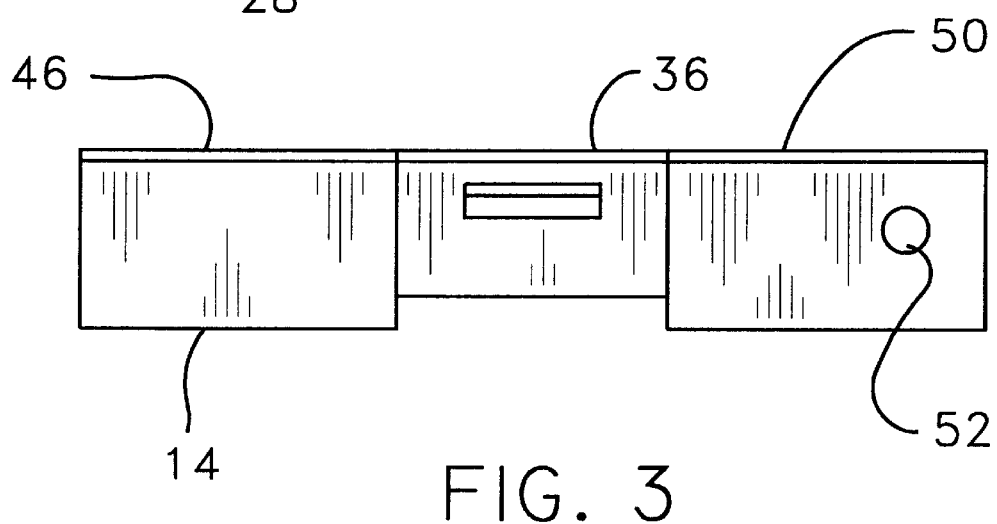
FIG. 3 is a schematic front view of the present invention.
Figure 4:
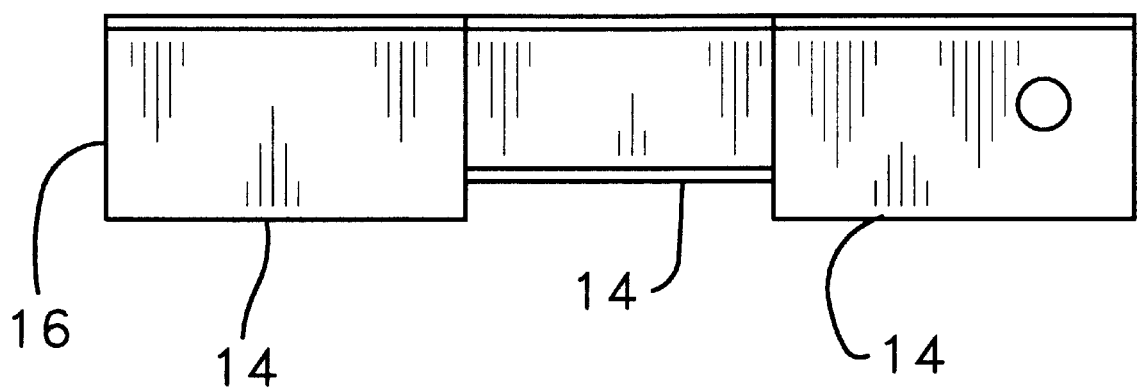
FIG. 4 is a schematic front view of the present invention.
Figure 5:
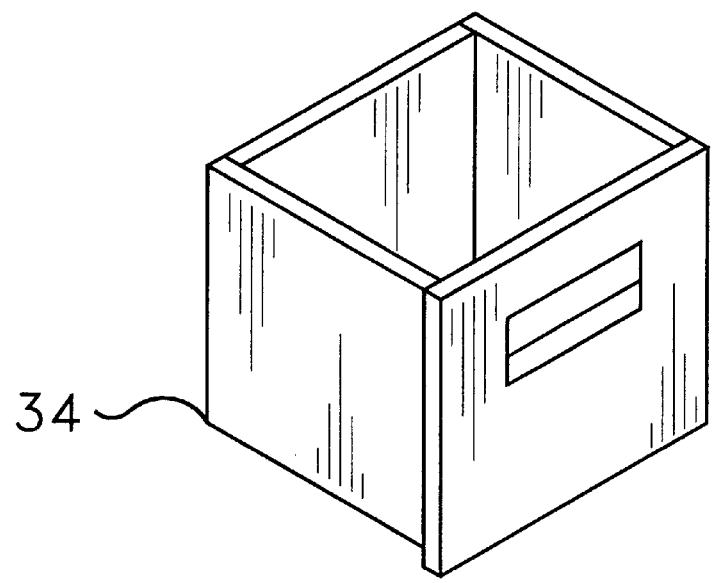
FIG. 5 is a schematic perspective view of the drawer of the present invention.

With reference now to the drawings, and in particular to FIGS. 1 through 5 thereof, a new storage device embodying the principles and concepts of the present invention and generally designated by the reference numeral 10 will be described.

As best illustrated in FIGS. 1 through 5, the storage device 10 generally comprises a device for positioning under the rear seat 70 of a pick-up truck. The device 10 includes a housing 12 having a bottom wall 14 and a peripheral wall 16 attached to and extending upwardly from the bottom wall 14. The peripheral wall 16 includes a front wall 18, a back wall 20, a first side wall 22 and a second side wall 24. A pair of intermediate walls 26 extend from the back wall 20 to the front wall 18. The intermediate walls 26 are spaced from each other such that the housing 12 is divided into a first compartment 28, a second compartment 30 and a third compartment 32. The second compartment 30 is positioned between the first 28 and third 32 compartments. The front wall 18 of the second compartment 30 is open. The bottom wall 14 of the second compartment 30 is in a plane oriented parallel to and positioned above a plane of the bottom wall 14 of the first 28 and third 30 compartments. A drawer 34 is positioned in the second compartment 30. The drawer 34 extends through the front wall 18 and toward the back wall 20. A top wall 36 is attached to and extends between an upper edge of the intermediate walls 26. The top wall 36 is positioned over a portion of the second compartment 30 such that the top wall 36 covers the drawer 34 when the drawer 34 is fully extended into the second compartment 30. The housing 12 has a length from the first side wall to the second side wall preferably between 50 inches and 60 inches. Each of the side walls 22, 24 has a height generally between 6 inches and 10 inches. Each of the side walls 22, 24 has a length from the front wall to the black wall preferably between 12 inches and 16 inches. Additional walls 38 may divide the compartments into smaller portions.

A cover 40 is pivotally coupled to an upper edge of the back wall 20. The cover 40 is positionable over the housing 12. The cover 40 includes a panel 42 having a back edge 44 and a front edge 45. The back edge 44 is adjacent to the back wall 20. The panel 42 is divided into a first portion 46, a second portion 48 and a third portion 50. The first portion 46 is removably positionable over the first compartment 28 such that the front edge 45 of the first portion 46 extends to the front wall 18. The second portion 48 is removably positionable over the second compartment 30 such that the front edge 45 of the second portion 48 extends to the top wall 36. The third portion 50 is removably positionable over the third compartment 32 such that the front edge 45 of the third portion 50 extends to the front wall 18.

A conventional cigarette lighter 52 is positioned in the front wall 18. Ideally the cigarette lighter 52 is operationally coupled to the power supply of the pick-up truck.

In use, wherein the housing 12 is positioned below the rear seat 70. The compartments 28, 30, 32 are used for placing articles such as tools therein. The bottom wall 14 of the second compartment 30 is raised compared to the first 28 and third 32 compartments for easy removal of the drawer 34 from the housing 12.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A storage device for positioning under the rear seat of a pick-up truck, said device comprising:

a housing having a bottom wall and a peripheral wall attached to and extending upwardly from said bottom wall, said peripheral wall including a front wall, a back wall, a first side wall and a second side wall, a pair of intermediate walls extending from said back wall to said front wall and being spaced from each other such that said housing is divided into a first compartment, a second compartment and a third compartment wherein said second compartment is positioned between said first and third compartments;

a cover being pivotally coupled to an upper edge of said back wall, said cover being positionable over said housing;

wherein said housing may be positioned below the rear seat;

wherein said front wall of said second compartment is open, a drawer being positioned in said second compartment, said drawer extending through said front wall and toward said back wall; and a top wall being attached to and extending between an upper edge of said intermediate walls, said top wall being positioned over a portion of said second compartment such that said top wall covers said drawer when said drawer is extended into said second compartment.

2. The storage device as in claim 1, wherein said bottom wall of said second compartment is in a plane oriented parallel to and positioned above a plane of said bottom wall of said first and third compartments.

3. The storage device as in claim 1, wherein said housing has a length from said first side wall to said second side wall generally between 50 inches and 60 inches, each of said side walls having a height generally between 6 inches and 10 inches, each of said side walls having a length from said front wall to said black wall generally between 12 inches and 16 inches.

4. The storage device as in claim 1, wherein said cover includes a panel has a back edge and a front edge, said back edge being adjacent to said back wall, said panel being divided into a first portion, a second portion and a third portion, said first portion being removably positionable over said first compartment such that said front edge of said first portion extends to said front wall, said second portion being removably positionable over said second compartment such that said front edge of said second portion extends to said top wall, said third portion being removably positionable over said third compartment such that said front edge of said third portion extends to said front wall.

5. A storage device for positioning under the rear seat of a pick-up truck, said device comprising:

a housing having a bottom wall and a peripheral wall attached to and extending upwardly from said bottom wall, said peripheral wall including a front wall, a back wall, a first side wall and a second side wall, a pair of intermediate walls extending from said back wall to said front wall and being spaced from each other such that said housing is divided into a first compartment, a second compartment and a third compartment wherein said second compartment is positioned between said first and third compartments, said front wall of said second compartment being open, said bottom wall of said second compartment being in a plane oriented parallel to and positioned above a plane of said bottom wall of said first and third compartments, a drawer being positioned in said second compartment, said drawer extending through said front wall and toward said back wall, a top wall being attached to and extending between an upper edge of said intermediate walls, said top wall being positioned over a portion of said second compartment such that said top wall covers said drawer when said drawer is extended into said second compartment, said housing having a length from said first side wall to said second side wall generally between 50 inches and 60 inches, each of said side walls having a height generally between 6 inches and 10 inches, each of said side walls having a length from said front wall to said black wall generally between 12 inches and 16 inches;

a cover being pivotally coupled to an upper edge of said back wall, said cover being positionable over said housing, said cover including a panel having a back edge and a front edge, said back edge being adjacent to said back wall, said panel being divided into a first portion, a second portion and a third portion, said first portion being removably positionable over said first compartment such that said front edge of said first portion extends to said front wall, said second portion being removably positionable over said second compartment such that said front edge of said second portion extends to said top wall, said third portion being removably positionable over said third compartment such that said front edge of said third portion extends to said front wall;

a cigarette lighter being positioned in said front wall; and wherein said housing may be positioned below the rear seat.

* * * * *